United States Patent
Finn

(10) Patent No.: US 9,256,773 B2
(45) Date of Patent: Feb. 9, 2016

(54) CAPACITIVE COUPLING OF AN RFID TAG WITH A TOUCH SCREEN DEVICE ACTING AS A READER

(71) Applicant: David Finn, Tourmakeady (IE)

(72) Inventor: David Finn, Tourmakeady (IE)

(73) Assignee: Féinics AmaTech Teoranta, Lower Churchfield, Tourmakeady, Co. Mayo (IE)

( * ) Notice: Subject to any disclaimer, the term of this patent is extended or adjusted under 35 U.S.C. 154(b) by 271 days.

(21) Appl. No.: 13/858,126

(22) Filed: Apr. 8, 2013

(65) Prior Publication Data

US 2013/0271265 A1    Oct. 17, 2013

Related U.S. Application Data

(63) Continuation-in-part of application No. 13/294,578, filed on Nov. 11, 2011, now abandoned, and a continuation-in-part of application No. 13/224,351, filed on Sep. 2, 2011.

(60) Provisional application No. 61/622,011, filed on Apr. 10, 2012, provisional application No. 61/654,154, filed on Jun. 1, 2012, provisional application No. 61/511,990, filed on Jul. 27, 2011.

(51) Int. Cl.
| | |
|---|---|
| *H01F 38/14* | (2006.01) |
| *G06K 7/10* | (2006.01) |
| *G06K 19/07* | (2006.01) |
| *H01Q 1/22* | (2006.01) |
| *H01Q 7/00* | (2006.01) |

(52) U.S. Cl.
CPC ........ *G06K 7/10336* (2013.01); *G06K 19/0723* (2013.01); *H01Q 1/2225* (2013.01); *H01Q 7/00* (2013.01); *H01F 2038/146* (2013.01)

(58) Field of Classification Search
USPC .......................................... 235/492; 307/104
See application file for complete search history.

(56) References Cited

U.S. PATENT DOCUMENTS

| | | | |
|---|---|---|---|
| 5,281,855 | A | 1/1994 | Hadden et al. |
| 5,471,040 | A | 11/1995 | May |
| 6,018,299 | A | 1/2000 | Eberhardt |
| 6,040,773 | A | 3/2000 | Vega et al. |
| 6,094,138 | A | 7/2000 | Eberhardt et al. |
| 6,107,920 | A | 8/2000 | Eberhardt et al. |
| 6,130,613 | A | 10/2000 | Eberhardt et al. |
| 6,147,605 | A | 11/2000 | Vega et al. |
| 6,252,508 | B1 | 6/2001 | Vega et al. |
| 6,265,977 | B1 | 7/2001 | Vega et al. |

(Continued)

FOREIGN PATENT DOCUMENTS

| | | |
|---|---|---|
| DE | 10 2004 045 896 | 3/2006 |
| EP | 2 418 607 | 2/2012 |

(Continued)

*Primary Examiner* — Christle I Marshall
(74) *Attorney, Agent, or Firm* — Gerald E Linden

(57) ABSTRACT

Capacitive coupling of an RFID tag with a touch screen device acting as an RFID reader, and methods to produce a capacitive coupling tag. A capacitive coupling tag, which communicates at near field distance with a host computing device by using the touch screen display of the host when the tag is placed on the touch screen or held in contact in close proximity to the touch screen by a person acting as a ground electrode and thereby causing a difference in electrical potential. A capacitive coupling tag which operates with or without a chip.

19 Claims, 4 Drawing Sheets inductive antenna connected in parallel with capacitive antenna

(56) References Cited

U.S. PATENT DOCUMENTS

| | | | |
|---|---|---|---|
| 6,611,199 B1 | 8/2003 | Geizler et al. | |
| 6,879,809 B1 | 4/2005 | Vega et al. | |
| 7,820,097 B2 | 10/2010 | Schroder et al. | |
| 7,932,642 B2 * | 4/2011 | Bauchot et al. | 307/104 |
| 8,608,066 B2 * | 12/2013 | Frojdh | 235/380 |
| 8,803,844 B1 * | 8/2014 | Green et al. | 345/174 |
| 2004/0036682 A1 * | 2/2004 | Zobuchi | 345/179 |
| 2007/0230103 A1 | 10/2007 | Baumann et al. | |
| 2009/0092951 A1 * | 4/2009 | Hou et al. | 434/156 |
| 2009/0167699 A1 * | 7/2009 | Rosenblatt et al. | 345/173 |
| 2009/0189457 A1 * | 7/2009 | Bauchot et al. | 307/104 |
| 2010/0123581 A1 * | 5/2010 | Hatfield et al. | 340/572.3 |
| 2011/0253789 A1 | 10/2011 | Thiele et al. | |
| 2012/0125993 A1 | 5/2012 | Thiele et al. | |
| 2012/0234922 A1 * | 9/2012 | Sample et al. | 235/492 |

FOREIGN PATENT DOCUMENTS

| | | |
|---|---|---|
| EP | 2 432 074 | 3/2012 |
| WO | WO 2005122068 | 12/2005 |
| WO | WO 2008043794 | 4/2008 |

* cited by examiner silicon chip with antenna printed on a sheet of paper inductive antenna connected in parallel with capacitive antenna

CAPACITIVE COUPLING OF AN RFID TAG WITH A TOUCH SCREEN DEVICE ACTING AS A READER

CROSS-REFERENCE(S) TO RELATED APPLICATION(S)

Priority (or continuation-in-part (CIP)) status is claimed from commonly-owned, co-pending
61/622,011 filed Apr. 10, 2012 ("s44pp 2")
61/654,154 filed Jun. 1, 2012 ("s44pp 3")
This is a CIP of Ser. No. 13/294,578 filed Nov. 11, 2011 ("S32") which claims priority from
U.S. 61/511,990 filed Jul. 27, 2011 ("s44ppa")
This is a CIP of Ser. No. 13/224,351 Sep. 2, 2011 ("S41") which claims priority from
U.S. 61/511,990 filed Jul. 27, 2011 ("s44ppa")

TECHNICAL FIELD

The invention relates broadly to smart cards which may be RFID (radio frequency identification) tags.

BACKGROUND

A touchscreen is an electronic visual display that can detect the presence and location of a touch within the display area. The term generally refers to touching the display of the device with a finger or hand. Touchscreens can also sense other passive objects, such as a stylus. Touchscreens are common in devices such as game consoles, all-in-one computers, tablet computers, and smartphones. There are a variety of touchscreen technologies that have different methods of sensing touch, including resistive, surface acoustic wave (SAW), and capacitive.

A capacitive touchscreen panel may consist of an insulator such as glass, coated with a transparent conductor such as indium tin oxide (ITO). As the human body is also an electrical conductor, touching the surface of the screen results in a distortion of the screeds electrostatic field, measurable as a change in capacitance. Different technologies may be used to determine the location of the touch. The location is then sent to the controller for processing. There are various capacitive touchscreen technologies, such as Projected Capacitive Touch (PCT), mutual capacitance, and variations thereof, that allow for multi-touch operation where multiple fingers, palms or styli can be accurately tracked at the same time. Hundreds, perhaps thousands of distinct capacitive events can theoretically simultaneously be detected in a touchscreen.

Radio-frequency identification (RFID) is the use of a wireless non-contact system that uses radio-frequency electromagnetic fields to transfer data from a "tag" (or "transponder") attached to an object, for the purposes of automatic identification and tracking. Some tags require no battery and are powered by the electromagnetic fields used to read them. Others use a local power source and emit radio waves (electromagnetic radiation at radio frequencies). The tag contains electronically stored information which can be read with an external reader device. Smart cards and electronic passports utilize RFID technology to exchange information, primarily from the card or passport to the external reader. In some RFID applications, information may be provided by the reader to be stored in the tag.

Electrostatic or capacitive coupling is the passage of electrical energy through a dielectric. In practice it is an electric field gradient or differential capacitance between two or more insulated terminals, plates, electrodes, or nodes that are elevated over a conducting ground plane. The electric field is created by charging the plates with a high potential, high frequency alternating current power supply. The capacitance between two elevated terminals and a powered device form a voltage divider.

Radio is the transmission and reception of electromagnetic (EM) waves, usually in the far field where the wave is considered planar. In contrast therewith, capacitively coupled RF signals may use only the E-field in the near field.

As disclosed herein, an RFID tag having an RFID IC (integrated circuit) may be capacitively coupled with a touch screen display or interface device allowing the transmission of encrypted data to and from an RFID integrated circuit connected to capacitive plates. Capacitive plates are provided in the RFID tag, connected with the RFID IC.

The touch screen device may be used to energize the RFID IC to enable data exchange with the processing unit. In particular, a touch screen device hosting an application in its data-processor which triggers the touch screen display to act as a capacitive coupling RFID reader.

The invention also related to methods of producing capacitive coupling tags in particular the application of low resistance interconnections between the pads on an RFID integrated circuit to an interposer and the interconnections between said interposer and a capacitive coupling antenna or antennas. Further the invention encompasses the combination of inductive and capacitive coupling for two factor authentication.

The technology associated with capacitive coupling of an RFID tag with a touch screen device and the method of producing such a tag can be divided into four parts, namely (1) the technique of capacitive coupling with a reader; (2) the method of mounting an integrated circuit on a carrier to form an interposer; (3) the method of coating or metallizing a substrate to produce a conductive antenna plate or conductive antenna wings; and (4) the method of interconnecting the interposer or naked die to the coated or metallized substrate, and are described hereinafter.

Some Prior Art Related to Capacitive Coupling

All patents and publications referenced herein may be incorporated by reference herein.

EP 2 418 607 discloses a capacitive data carrier on which at least one electrical conductive Touch Structure is arranged on an electrical non-conducting substrate. Further a system and process for recording of data consisting of a capacitive information carrier, a capacitive surface sensor, a contact between both elements and an interaction, in which the Touch Structure of the information carrier allows for the surface sensor connected to a data processor to analyze, and with said information carrier triggering an associated event(s).

Claim 1: Capacitive information carrier (1), which comprises at least one electrical conductive layer as Touch Structure (3) arranged on an electrical non-conducting substrate (2).

Claim 2: Capacitive information carrier (1) according to claim 1, wherein on an electrical non-conducting substrate (2) is arranged at least one electrical conductive layer having a Touch Structure (3) designed on the form and/or features of a finger tip.

U.S. 2011/0253789 discloses an identification system, comprising an information carrier or a group of such information carriers, which allow a clear association of information. The invention further relates to the use of said information carriers, and to a device for reading said information carriers, wherein the information carriers are associated with a random action of a data processing system by way of the structured information layer thereof or can trigger such action. The invention furthermore relates to information carriers for access control systems, payment systems, ticket systems, and marketing application. According to the invention, overlaps of the information layer can be provided by applying additional layers, which achieve several advantages according to the invention, such as optically rendering the information layer unrecognizable, and resulting increased safety of the information carrier against manipulation. In addition, the information layers can be applied in an absolutely level and thin manner onto the carrier material, which enables unlimited further processing.

Claim 1: Information carrier wherein on the information carrier, which comprises an electrically non-conductive substrate with an electrically non-conductive adhesive layer applied to one or more areas of the substrate, on which is arranged an electrically conductive information layer, comprising of at least a single layer, at least one additional layer, covering at least the area of the substrate with the structured information layer is positioned, preferably a paper layer and/or a foil layer and/or a color layer and/or a lacquer layer or combinations thereof.

Claim 2: Information carrier according to claim 1, wherein a reading device can recognize and/or measure the information layer, which is applied to one or more areas, and the information content of the information carrier is thereby determined Claim 3: Information carrier according to claim 1, wherein the information layer includes metals, graphite, soot and/or dielectric materials and the other layers include at least one adhesive layer and/or at least one paper layer and/or at least one color layer and/or a lacquer layer and/or a foil.

Claim 4: Information carrier according to claim 1, wherein the structured information layer comprises full surfaces defined by corners and/or curves, in particular by rectangles and/or circles, wherein the position, the form and/or the surface itself are determinable as components of the structured information layer via a reading device and they represent the information content of a specific number of data carriers.

Claim 5: Information carrier according to claim 1, wherein the information layers applied may be changed, area by area, in their structuring, via additive and/or subtractive processes, preferably by inkjet processes, and particularly preferably by laser processes.

Claim 6: Information carrier according to claim 1, wherein the substrate comprises paper, cardboard, derived timber products, composite materials, laminates and/or synthetic materials.

Claim 7: Information carrier according to claim 1, wherein additional optical, electrical, electronic, sensory and/or acoustic elements are applied on the information carrier.

Claim 8: Information carrier according to claim 1, wherein secondary information can be applied or contained on the information carrier, which, in particular, allow for determination of an orientation or speed of the information carrier relative to the reading device.

Claim 9: Information carrier, according to claim 1, wherein features and/or elements are applied or incorporated, which contain additional optical information, in particular printed values, symbols, signs, safety and authenticity features, particularly on playing cards and/or collectors' cards.

Claim 10: Group of information carriers, comprising several information carriers according to claim 1, wherein at least one color layer, adhesive layer, paper layer and/or foil is applied in each case at least as background, cover, number, letter, sign, graphic presentation and/or image presentation, or a combination thereof, wherein several information carriers have the same structure of the information layer and at least one identically designed color layer so that a closed group of information carriers that are the same in terms of information technology and optics is created, several information carriers have the same structure of the information layer and at least one differently designed color layer, so that a group of information carriers with the same information technology but different optics is created, several information carriers have an information layer with a different structure and at least one identically designed color layer, so that a group of information carriers, each with its own information technology but with the same optics, is created, several information carriers have information layers with different structures and at least one differently designed color layers, so that information carriers are created that are completely different from one another, with regard to both information technology and optics.

Claim 11: Identification system, wherein it comprises at least one information carrier according to claim 1 and at least one reading device, wherein the information carrier comprises an adhesive layer and an information layer, and the information layer is a layer applied via transfer method, preferably via transfer foil method, and particularly preferably via cold foil transfer method.

Claim 12: Identification system according to claim 11, wherein at least one reading device is interconnected with at least one additional data processing medium.

Claim 13: Identification system, according to claim 11, wherein the reading device has either a well, a slit and/or a surface to receive at least a part of the information carrier and that the information carrier is positioned in, at, or on the reading device in a predefined or random way.

Claim 14: A method comprising: providing an information carrier according to claim 1, a group of information carriers comprising several of said information carriers and/or an identification system comprising at least one of said information carriers, wherein the information carrier(s) determine(s) the interpretation of the information contained on the information carrier through its (their) structured information layer via a reading device, achieving this preferably by having the information layer divided into an area that describes the interpretation and an area that carries the information.

Claim 15: A method comprising: providing an information carrier according to claim 1, a group of information carriers comprising several of said information carriers and/or an identification system comprising at least one of said information carriers, wherein the structured information layer is via a reading device, the arrangement of whose electrodes is so designed and constructed that the number and/or size and/or form and/or position of the structured information layer(s) of the information carrier(s), recognized, acquired and further processed.

Claim 16: A method comprising: providing an information carrier according to claim 1, a group of information carriers comprising several of said information carriers and/or an identification system comprising at least one of said information carriers, wherein the information carrier(s), in connection with a reading device, is (are) assigned, through its or their structured information layer, to an action of a data processing system, or trigger(s) it, preferably this concerns actions on non-networked data processing systems, and particularly preferably on networked data processing systems.

Claim 17: A method comprising: providing an information carrier according to claim 1, a group of information carriers comprising several of said information carriers and/or an identification system comprising at least one of said information carriers, wherein it or they is or are assigned to a record in a data processing device, and the record remains constant or changes in the course of its use.

Claim 18: A method comprising: providing an information carrier according to claim 1, a group of information carriers comprising several of said information carriers and/or an identification system comprising at least one of said information carriers, wherein the information carrier(s) is (are) used for playing cards, collectors' cards, stamps, franking, postage, goods routing, goods tracking, admission, entry cards, access to closed areas, virtual contents, marketing applications, customer loyalty, lotteries and games of chance, member identification, time cards, payment applications, certificates of authenticity, certificates, forgery protection, copy protection, signatures, delivery certificates, objects involved in computer games, music/video/e-book downloads, bonus stamps/programs or gift cards.

Claim 19: A method comprising: providing an information carrier according to claim 2, a group of information carriers comprising several of said information carriers and/or an identification system comprising at least one of said information carriers, wherein the information content is completed and the assignment to another record released only in combination with at least one other information carrier.

U.S. 2012/0125993 discloses a data carrier or a group of such data carriers which allow for accurate correlation of information, the use of these data carriers, as well as a reading device, by means of which a data carrier via its structured information layer is associated with an action of a data processing system or can trigger the said action. More particularly, the invention also relates to a game card system that learns the unique playing characteristics of players and allows the processing of other game-related data, whereby the system comprises the use of game cards and collector cards over the Internet (online) as well as via a local data processing system (offline), and where, accordingly, the invention relates to a particularly preferred embodiment, that is a combination of the traditional collector card game with computer and video games. More preferably, the invention also serves as an access system for cards and debit cards for payment systems using the data carrier with a unique code that is readable using a reading device.

The carrier has an adhesive layer and a single structured information layer, which are provided on an electrically non-conducting substrate. Another layer covers a region of the substrate with the structured information layer, where the information layer is an applied transfer layer. A region of the structured information layer is an encoder for a capacitive reader, and the information layer comprises metal, graphite, carbon black and/or dielectric material. The substrate comprises a paper, a cardboard, a wood material, a composite material, a laminate and/or plastic. An independent claim is also included for a data processing system comprising a reader and a data carrier.

Claim 1: Data carrier, comprising an at least sectionally applied adhesive layer is arranged on an electrically non-conductive substrate, an at least single-layered information layer congruently applied thereto, wherein the said adhesive layer and information layer are layers applied as coatings by a transfer process, preferably through a foil transfer method and more preferably through a cold foil transfer method and wherein at least a portion of the structured information layer serves at the same time as an encoder for a capacitive reading device.

Claim 2: Data carrier according to claim 1, wherein at least an area of the substrate covered by the structured information layer has another layer arranged over it that can be, for example, a paper layer and/or a foil layer and/or a paint layer and/or a lacquer layer or combinations thereof.

Claim 3: Data carrier according to claim 1 wherein the information layer comprises metals, graphite, carbon black and/or dielectric materials while the remaining layers comprise at least an adhesive layer and/or at least a paper layer and/or at least one paint layer and/or a lacquer layer and/or a foil.

Claim 4: Data carrier according to claim 1 wherein said structured information layer comprises fill areas delimited by corners and/or curves, particularly rectangles and/or circles, and wherein the position, shape and/or the area themselves serve as components of the structured information layer and can be detected via a reading device that can display the information content of a certain number of data carriers.

Claim 5: Group of data carriers comprising several data carriers according to claim 1, wherein at least one paint layer, adhesive layer, paper layer and/or foil is applied in each case at least as a background, coverage, number, letter, character, graphic representation and/or visual representation or a combination thereof, wherein several data carriers have the same structure of the information layer and at least one paint layer having the same design, so that a self-contained group of information-technologically and visually identical data carriers is obtained, several data carriers have the same structure of the information layer and at least one paint layer having a different design, so that a self-contained group of information-technologically identical and visually different data carriers is obtained, several data carriers have a different structure of the information layer and at least one paint layer having the same design, so that a group of information-technologically unique but visually identical data carriers is obtained, several data carriers have a different structure of the information layer and at least one paint layer having a different design, so that a completely, that is visually and information-technologically, unique data carrier is obtained.

Claim 6: Data carriers according to claim 1, wherein the structuring of the applied information layers is changed sectionally via additive and/or subtractive methods, preferably by inkjet methods and more preferably through modification by laser methods.

Claim 7: Data carriers according to claim 1, wherein the substrate comprises paper, cardboard, wood products, composites, laminates and/or plastic.

Claim 8: Data carriers according to claim 1, wherein other optical, electrical, electronic, sensory and/or acoustic elements are applied to the data carrier.

Claim 9: Data carriers according to claim 1, wherein secondary information can be applied onto or be contained by the data carrier, in particular to enable determining an orientation or speed of the data carrier relative to a reading device.

Claim 10: Data carriers according to claim 1, wherein features and/or elements are further attached that contain additional optical information, in particular printed values, symbols, signs, security and/or authenticity features, especially on game cards and/or collector cards.

Claim 11: Method of detecting, capturing and processing the structured information layer of the data carrier of claim 1, wherein the structured information layer is detected, captured, and data-technologically processed further via a reading device who electrode arrangement is so designed and arranged that the number and/or size and/or shape and/or position of the structured information layer of the data carrier.

Claim 12: Method comprising attributing to or triggering an action of a data processing system wherein the data carrier of claim 1 in conjunction with a reading device via its structured information layer is associated with or triggers said action wherein this preferably applies to actions on non-networked data processing systems, and more preferably on networked computer systems.

Claim 13: Method comprising associating the data carrier of claim 1 with a data set in a data processing device and the data carrier remains constant or changes during its use.

Claim 14: Method comprising: providing the data carrier of claim 1, wherein the data carrier is used for game cards, collector cards, stamps, franking, postage, goods logistics, goods tracking, admission, admission tickets, access to closed areas, virtual content, marketing applications, customer loyalty, lotteries and sweepstakes, membership cards, time cards, payment applications, authenticity certificates, forgery prevention, copy protection, signatures, delivery bulletins, items within a computer game, music/video/e-book downloads, bonus stamps/programs or gift cards.

Claim 15: Method comprising: providing the data carrier of claim 1 and completing an information content of said data carrier only in combination with at least one other data carrier and thus clearing an assignment to another data set.

Claim 16: Data processing system, comprising the data carrier of claim 1, wherein the reading device has either a recess, a slot and/or a support surface to accept at least a portion of the data carrier while the data carrier is presented or placed anywhere in, on, or at the reading device.

EP 2 432 074 discloses a component with at least one UHF dipole aerial produced by means of printing. The component has two distant dipole ends (3) and a transfer foil that is prepared on a roller, whereby the transfer foil has a carrier foil and an electrically conductive transfer layer. A non-conductive substrate and an adhesive are formed, whereby structured creation of the adhesive is carried out on a substrate (1). The structure of the adhesive is applied such that the maximum distance of the dipole ends lies transverse to revolution direction. An independent claim is also included for an ultra-high frequency dipole-antenna system, which has a Radio frequency identification transponder.

U.S. 2007/0230103 discloses a method and apparatus for integrating electronic components on conductor tracks as well as corresponding electronic components. With the invention, the electronic component can be applied with less precision on a printing material such as a substrate to be printed or a printed product. In a subsequent processing step, one or more printing units print conductor tracks. The conductor tracks are oriented through registration of the printing unit or the conveyor mechanism to the previously applied electronic component.

The following are also referenced, and may be incorporated by reference herein: DE 10 2005 002 149; DE 10 2006 013 070; DE 10 2006 038 362; DE 10 2007 029 384; DE 10 2007 030 308; DE 10 2007 041 269; DE 10 2007 041 270; DE 10 2008 015 342; EP 1 803 562; U.S. Pat. No. 5,818,019; U.S. Pat. No. 3,719,804; U.S. Pat. No. 4,587,410; and U.S. 2006/0118612.

U.S. Pat. No. 6,879,809 discloses a wireless electrostatic charging and communicating system which includes an electrostatic reader, an electrostatic charger and an electrostatic rechargeable device or electrostatic transceiver such as such as a smart card or radio frequency identification (RFID) card without requiring physical contact to electrodes. The electrostatic system is capacitance based and the charging and communicating occurs over capacitively coupled electrostatic electrodes or electrostatic electrodes. The electrostatic rechargeable device or transceiver includes a charge receiver and an energy storage means, for being charged or communicated with in the electrostatic system. The energy storage means may be any energy storage device including a rechargeable battery or capacitor. In a second embodiment, the electrostatic rechargeable device or transceiver includes an electrostatic charge receiver and an electromagnetic charge receiver with the energy storage means so that it may be alternatively charged or communicated with in an electrostatic system or an electromagnetic system for compatibility in either system.

U.S. Pat. No. 6,611,199 discloses a portable communication device uses a first electrostatic antenna element and a second electrostatic antenna element and circuitry which is coupled to the first antenna element and to the second antenna element and which derives operating power from an electrostatic field in the vicinity of the first and second antenna elements. The electrostatic field may be provided by an array of exciter elements containing both horizontal and vertical exciter elements so that at some point as a communication device is moved across the exciter antenna array, the device will have sufficient power coupled to it to power up and become operational.

Claim 40: A capacitively coupled system comprising: an exciter device comprising: an exciter circuit coupled to an external ground potential; an exciter antenna element coupled to the exciter circuit; a receiver circuit coupled to the external ground potential; a receiver antenna element coupled to the receiver circuit; and a remotely powered device comprising: a device antenna element capacitively coupled to the exciter antenna element and the receiver antenna element; and a circuit couples to the device antenna element and to the external ground potential.

Claim 45: The system of claim 40 wherein the external ground potential is an earth ground.

U.S. Pat. No. 6,265,977 discloses a radio frequency identification device (100, 200, 300, 350, 400, 500, 700) includes a substrate member (110) having a first surface (109) and a second surface (111). Disposed on the first surface of the substrate member are a first antenna element (112) and a second antenna element (114). The first and second antenna elements are electrically isolated from each other and are coupled to two separate pads on an integrated circuit (116, 116'). The integrated circuit includes a power circuit (814) that produces a supply voltage for electronics on the integrated circuit in response to voltages coupled over the air to the pads on the integrated circuit via the first and second antenna element. Adhesive (118) is applied on the first surface of the substrate, the first and second antenna elements and the integrated circuit for securing the tag to a person or thing.

FIG. 11 is an alternate preferred embodiment of the invention showing a back plan view of a tag 700. Tag 700 has antenna elements 712, 714 disposed on substrate 710. Integrated circuit 116 is disposed on and coupled to antenna elements 712, 714. Tag 700 corresponds in its components to tag 100, except that the arrangement of the antenna elements 712, 714 is different from the arrangement of antenna elements 112, 114. More specifically, antenna elements 112, 114 form a "bow tie" pattern and antenna elements 712, 714 form a "checker board" pattern. Tag 700 is preferred in an application where tag 700 is likely to be oriented with respect to ground 720 as shown in FIG. 11. In this orientation, one of the antenna elements, in this case, antenna element 712, is closer to ground than the other antenna element, in this case, antenna element 714. The checkerboard pattern advantageously maintains the relative relationships between the antenna elements and ground throughout rotations of tag 700. It should be noted that the arrangement of the antenna elements, however, can have a variety of forms and shapes, including, but not limited to, symmetrical patterns, non-symmetrical patterns, and/or unequal patterns.

U.S. Pat. No. 6,252,508 discloses a radio frequency identification tag system (10) utilizes a radio frequency identification tag (16) that includes stored tag information. The tag includes an antenna element (30) and a common electrode (28). The antenna element electrostatically receives an exciter signal (34) from a proximately-located electrostatic exciter (12). Upon receiving the exciter signal, the tag becomes energized, thereby causing it to generate a read signal (36) based on the stored tag information. The antenna element then electrostatically sends the read signal to a proximately-located reader (14), which detects the stored tag information. In addition, exactly one of the tag common electrode and the tag antenna element is arranged to magnetically store tag state information. The tag state information represents exactly one state of two possible states and is read by a proximately-located magnetic reader (18).

With reference to FIG. 8, an alternate preferred embodiment radio frequency identification tag 800 shown. Radio frequency identification tag 800 is arranged for use in, for example, radio frequency identification tag system 40. Radio frequency identification tag 800 includes tag common electrode 802, first tag antenna element 804 and second tag antenna element 806 coupled to tag circuit 808. Tag common electrode 802 is arranged to couple to ground. In a preferred embodiment (not shown), tag common electrode 802 may be arranged to couple to a person or an animal. In this manner, tag common electrode 802 is coupled to ground by means of the person or animal. Tag common electrode 802 may also be arranged to couple to an article (not shown). In this manner, tag common electrode 802 is coupled to ground by means of the article. In preferred applications, the article may be a loaned, leased or rented article such as, for example, a video medium, an audio medium, a computer program, a computer game, a video game or a book. The article may also be a retail sales article. First tag antenna element 804 is arranged for electrostatically coupling exciter signal 34. Second tag antenna element 806 is arranged for electrostatically sending read signal 210. In a read/write embodiment, tag circuit 808 is preferably constructed from a derivative of the aforementioned TEMIC e5550 circuit chip, while in a read-only application, tag circuit 808 is preferably constructed from the Motorola Indala I341 circuit chip.

U.S. Pat. No. 6,040,773 discloses a radio frequency identification tag system (10) utilizes a radio frequency identification tag (16) that includes stored tag information. The tag includes an antenna element (30) and a common electrode (28). The antenna element electrostatically receives an exciter signal (34) from a proximately-located electrostatic exciter (12). Upon receiving the exciter signal, the tag becomes energized, thereby causing it to generate a read signal (36) based on the stored tag information. The antenna element then electrostatically sends the read signal to a proximately-located reader (14), which detects the stored tag information. In addition, exactly one of the tag common electrode and the tag antenna element is arranged to magnetically store tag state information. The tag state information represents exactly one state of two possible states and is read by a proximately-located magnetic reader (18).

Referring to FIG. 6, in a read/write embodiment of the present invention radio frequency identification tag 200 is advantageously constructed from a derivative of the aforementioned TEMIC e5550 circuit chip. In this regard, and with reference to FIG. 6, tag circuit 208 includes operatively coupled: 1) a rectifier and tag power circuit 250, 2) a clock circuit 252, 3) a write decoder circuit 254, 4) a memory 256, 5) a carrier signal and/or modulator circuit 258 and 6) a controller 260. More particularly, first tag antenna element 204 is coupled to rectifier and tag power circuit 250, and carrier signal and/or modulator circuit 258 is coupled to second tag antenna element 206. Upon becoming energized by exciter signal 34, rectifier and tag power circuit 250 provides a direct current (dc) power supply 251. Exciter signal 34 is further coupled from first tag antenna element 204 via rectifier and tag power circuit 250 to write decoder circuit 254 and clock circuit 252. Clock circuit 252 provides a clock signal to each of write decoder circuit 254, carrier signal and/or modulator circuit 258 and controller 260. Memory 256 retains the stored tag information and is accessed by controller 260 and carrier signal and/or modulator circuit 258. Upon excitation, carrier signal and/or modulator circuit 258 generates a read signal 210 with an appropriate modulation and couples it to second tag antenna element 206. Preferably read signal 210 is a transmitted signal modulated by means of at least one of an amplitude modulation, a frequency modulation or a phase modulation based upon the stored tag information. Read signal 210 is electrostatically coupled from second tag antenna element 206 to reader antenna element 26. In an alternate, read-only embodiment, the aforementioned Motorola Indala 1341 circuit chip may be used. It will be appreciated that in this embodiment write decoder circuit 254 is not included.

Tag common electrode 202 is arranged to couple to ground. In a preferred embodiment (not shown), tag common electrode 202 may be arranged to couple to a person or an animal. In this manner, tag common electrode 202 is coupled to ground by means of the person or animal. Tag common electrode 202 may also be arranged to couple to an article (not shown). In this manner, tag common electrode 202 is coupled to ground by means of the article. In preferred applications, the article may be a loaned, leased or rented article, such as, for example, a video medium, an audio medium, a computer program, a computer game, a video game or a book. The article may also be a retail sales article.

In accordance with a preferred embodiment of the present invention, exactly one of tag common electrode 202, first tag antenna element 204 and second tag antenna element 206 is arranged for magnetically storing tag state information. The tag state information is representative of exactly one state of two possible states. In this regard, the exactly one of tag common electrode 202, first tag antenna element 204 and second tag antenna element 206 is formed from a magnetic strip. The magnetic strip is preferably a single bit EAS magnetic strip—a suitable magnetic strip material being the aforementioned 3M magnetic strip sold under the product name Tattle Tape. The magnetic strip is arranged as a single bit EAS strip for storing the magnetically programmable tag state information. The magnetic strip is further arranged, as appropriate, as an effective tag common electrode 202, a first tag antenna element 204 or second tag antenna element 206 for operation as described.

1. Capacitive Coupling

The operation of the system described in U.S. Pat. No. 6,611,199 and U.S. Pat. No. 6,018,299 works on a capacitive coupling principle. Electric fields ("E-fields") are capacitively coupled to and from a reader and tag.

As in an inductive system, the capacitive coupling reader/writer generates an excitation field which serves as both the tag's source of power and its master clock. The tag cyclically modulates its data contents and transmits them to the reader's receiver circuit. The reader demodulates and decodes the data signal and provides a formatted data packet to a host computer for further processing.

Unlike conventional inductive systems, the capacitive coupling technique provides a simple and cost effective tag design, suitable for high volume or disposable applications. Capacitive coupling enables the elimination of inductive coils, capacitors, leadframes, low resistance interconnects and inflexible substrates.

Capacitive coupling tags may comprise a silicon chip attached to printed carbon ink electrodes on the back side of a paper label.

Unlike conventional inductive products, capacitive coupling tags enables the use of relatively high resistance interconnects. The RFID silicon (chip) is simply attached to the printed substrate. The tag to chip interconnect is facilitated by either direct chip attachment or by using an "interposer".

An interposer is an intermediate attachment mechanism. It is a small (typically ½" by ½" square), self-adhering, paper label with printed ink electrode "stems" connected to the RFID silicon. Supplied in roll-form, interposers allow simple in-line integration with existing high speed label manufacturing processes with minimal impact to existing equipment. Interposers enable label manufacturers to print larger tag electrode "extensions" without concern about intricate chip attachment.

The capacitive coupling readers have two configurations: monopole and dipole.

A monopole reader has a single radiating antenna that emits (radiates) an excitation signal. When the tag enters the signal field, the tag electrode closest to the emanating signal directs the current through the chip to the remaining tag electrode which is coupled to ground. The ground connection can be completed by a person holding a card to be read. Monopole readers offer the benefit of tag orientation flexibility.

In a dipole system, the reader has a set of two antennas that are set up to radiate and receive the excitation current. The tag must be presented to the reader such that both tag antennas "see" or couple to corresponding antennas connected to the reader to provide an operating voltage potential to the tag. Data is then transmitted from either of the tags' electrodes to a receiving antenna on the reader.

Some Prior Art Related to Capacitive Coupling

U.S. Pat. No. 6,611,199 discloses a portable communication device uses a first electrostatic antenna element and a second electrostatic antenna element and circuitry which is coupled to the first antenna element and to the second antenna element and which derives operating power from an electrostatic field in the vicinity of the first and second antenna elements. The electrostatic field may be provided by an array of exciter elements containing both horizontal and vertical exciter elements so that at some point as a communication device is moved across the exciter antenna array, the device will have sufficient power coupled to it to power up and become operational.

U.S. Pat. No. 6,018,299 discloses a radio frequency identification tag (14) which includes a radio frequency identification tag circuit chip (12) coupled to an antenna (10) including a conductive pattern (22) printed onto a substrate (16). The substrate may form a portion of an article, a package, a package container, a ticket, a waybill, a label and/or an identification badge. The conductive pattern includes a first coupling region (28) and a second coupling region (30) arranged for coupling to the radio frequency identification tag circuit chip. The first coupling region and the second coupling region are precisely located and isolated from one another via an aperture (31) formed in the substrate.

U.S. Pat. No. 6,040,773 discloses a radio frequency identification tag system (10) which utilizes a radio frequency identification tag (16) that includes stored tag information. The tag includes an antenna element (30) and a common electrode (28). The antenna element electrostatically receives an exciter signal (34) from a proximately-located electrostatic exciter (12). Upon receiving the exciter signal, the tag becomes energized, thereby causing it to generate a read signal (36) based on the stored tag information. The antenna element then electrostatically sends the read signal to a proximately-located reader (14), which detects the stored tag information. In addition, exactly one of the tag's common electrode and the tag antenna element is arranged to magnetically store tag state information. The tag state information represents exactly one state of two possible states and is read by a proximately-located magnetic reader (18).

U.S. Pat. No. 6,094,138 discloses an integrated circuit assembly (12) such as used on a radio frequency identification tag, or other device, which includes an integrated circuit (14) coupled to first and second printed conductors (16a) and (16b), such as tag electrodes, on a flexible substrate (18). The printed conductors (16a and 16b) may be conductors in the form of printed ink electrostatic antennas. The integrated circuit (14), is disposed in a generally co-planar arrangement with the flexible substrate (18). That is, the integrated circuit (14) is positioned in-line with the flexible substrate (18).

U.S. Pat. No. 6,107,920 discloses a radio frequency identification tag (14) which utilizes an antenna (22) formed in association with, and thus integral to, an article, package, package container, label and/or identification badge (10). In a preferred embodiment, a radio frequency identification tag circuit chip assembly (12) is secured to the article (10) and is electrically coupled to the antenna (22) formed on the article (10). Printing a conductive pattern on the article using conductive ink forms a preferred antenna.

U.S. Pat. No. 6,130,613 discloses a radio frequency identification stamp (10) which includes a substrate (24) with a first surface (12) and a second surface (18). The first surface (12) is printed with indicia indicating at least a postage value. An antenna (16) is formed on the second surface (18) and a radio frequency identification circuit chip (20) is secured to the second surface (18) and coupled to the antenna (16). A layer (22) of adhesive is also disposed on the second surface (18). A mailing label (600) includes indicia (614) printed on a first surface, and an antenna (616) coupled to a radio frequency identification circuit chip (620) on a second surface (618). A layer (622) of adhesive covers the second surface. The layer bonds the circuit chip (620) to the second surface and couples the circuit chip (620) to the antenna (616). The circuit chip (620) may retain a tracking number, and more preferably, retains sender information (601), recipient information (602), service type information (603) and billing instructions (604).

U.S. Pat. No. 6,147,605 discloses a radio frequency identification tag (100) which includes a first antenna element (112), a second antenna element (114) and a radio frequency identification circuit (116). The first antenna element (112) is electrically isolated from the second antenna element (114). The radio frequency identification circuit has a first pad (230) and a second pad (232). The first and second pads of the radio frequency identification circuit are coupled, respectively, to the first and second antenna elements. The radio frequency identification circuit includes a load modulation circuit (222) coupled to at least one of the first or second pads to produce a load modulated signal on at least one of the first or second pads that varies from a first amplitude to a second amplitude. The load modulation circuit has a modulation impedance and a predetermined voltage threshold that an input signal must exceed before the modulated signal is produced. The first and second pads of the integrated circuit have an input capacitance as measured between them. The modulation impedance, voltage threshold, and pad capacitance are optimized for electrostatic radio frequency identification applications. Alternatively, a modulation circuit is not coupled to the first and second antenna elements and is instead coupled through a third pad with a third electrostatic antenna element for data transmission. Also, electronic article surveillance (EAS) is alternatively provided with the radio frequency identification circuit and is alternatively, selectively defeated.

U.S. Pat. No. 6,252,508 discloses a radio frequency identification tag system (10) which utilizes a radio frequency identification tag (16) that includes stored tag information. The tag includes an antenna element (30) and a common electrode (28). The antenna element electrostatically receives an exciter signal (34) from a proximately-located electrostatic exciter (12). Upon receiving the exciter signal, the tag becomes energized, thereby causing it to generate a read signal (36) based on the stored tag information. The antenna element then electrostatically sends the read signal to a proximately-located reader (14), which detects the stored tag information. In addition, exactly one of the tag common electrode and the tag antenna element is arranged to magnetically store tag state information. The tag state information represents exactly one state of two possible states and is read by a proximately-located magnetic reader (18).

U.S. Pat. No. 6,265,977 discloses a radio frequency identification device (100, 200, 300, 350, 400, 500, 700) which includes a substrate member (110) having a first surface (109) and a second surface (111). Disposed on the first surface of the substrate member are a first antenna element (112) and a second antenna element (114). The first and second antenna elements are electrically isolated from each other and are coupled to two separate pads on an integrated circuit (116, 116'). The integrated circuit includes a power circuit (814) that produces a supply voltage for electronics on the integrated circuit in response to voltages coupled over the air to the pads on the integrated circuit via the first and second antenna element. Adhesive (118) is applied on the first surface of the substrate, the first and second antenna elements and the integrated circuit for securing the tag to a person or thing.

WO 2008/043794 discloses a system and a method for storing and reading information with a data storage medium for storing a piece of information and a reading unit for reading the information stored in the data storage medium, where the data storage medium has a dielectric and the information is formed by the presence or absence of at least one storage electrode in the data storage medium, and the reading unit has at least one input electrode and at least one reading electrode, the information being able to be read by coupling the data storage medium and the reading unit to one another such that the input electrode and the storage electrode form a first capacitor and the reading electrode and the storage electrode form a second capacitor. In addition, the reading unit has means for producing a digital voltage step on the input electrode and means for comparing the voltage step produced on the reading electrode with a reference voltage.

U.S. Pat. No. 5,471,040 discloses a data storage and retrieval system which includes an interface module and a data card. Both the interface module and card include a plurality of primary and secondary electrodes having the same pattern. The data card further includes a plurality of fuses extending between each of the primary and secondary electrodes. When the fuse is intact, it will conduct current. When the fuse is blown, the resistance will substantially increase. The state of the resistance of the fuse is used to represent bits of data. In operation, the card is juxtaposed with respect to the interface module so that the respective electrodes can be capacitively coupled. In order to read the data on the card, an output having a predetermined voltage and frequency is applied to the electrodes. The level of AC current passing through the fuse is measured and the result is used to derive the state of the fuse. When information is to be written onto the card, the voltage level and the oscillating frequency are increased causing the current flow in the electrodes to increase thereby blowing the fuse. The hardware is low in cost, requires low power to operate and provides a write once/read many-memory (WORM) in the form of a disposable data card.

WO 2005/122068 discloses a process of marking and to a method and a system for detection of the marking. The marking consists of electrically conductive and non-conductive areas formed on paper or cardboard by using a conductive polymer. The detection of the marking is based on a capacitive coupling between the marking (13, 23, 35) and at least one first (12, 22, 34) electrode coupling an excitation signal to the marking and at least one receiving second electrode (16, 26, 43). The information relating to this coupling is derived from the signal, which is obtained by means of the said electrodes, in such a way that the electrodes (12, 22, 34, 16, 26, 43) and the marking move relative to each other. With the aid of the invention, information can be advantageously stored in products.

2. Interposers

An interposer is an electrical interface routing between one socket or connection to another. The purpose of an interposer is to spread a connection to a wider pitch or to reroute a connection to a different connection.

Flip chip also known as Controlled Collapse Chip Connection or its acronym, C4, is a method for interconnecting semiconductor devices, such as IC chips and Micro-electromechanical systems (MEMS), to external circuitry with solder bumps that have been deposited onto the chip pads. The solder bumps are deposited on the chip pads on the top side of the wafer during the final wafer processing step. In order to mount the chip to external circuitry (e.g., a circuit board or another chip or wafer), it is flipped over so that its top side faces down, and aligned so that its pads align with matching pads on the external circuit, and then the solder is flowed to complete the interconnect. This is in contrast to wire bonding, in which the chip is mounted upright and wires are used to interconnect the chip pads to external circuitry.

Some Prior Art Related to Interposers

DE 10 2004 045 896 ("Muehlbauer") discloses a flipped-over (face down) flip chip module 2 with its two bump connection elements (both labeled "3") disposed on the front surface (bottom, as viewed) of the chip module, for subsequent connection to connection portions (such as ends) of an antenna wire. The challenge (problem) being illustrated is the difficulty of bonding each of the bump connection elements 3, 3 to a corresponding one of the connection portions 1a and 1b of the antenna wire (12). Muehlbauer shows the flip chip module 13 (compare 2) with two bump connection elements 14a, 14b (compare elements 3 of FIG. 1) on its front surface positioned facing a top surface of a transponder substrate 15. The transponder substrate 15 comprises a substrate (Brückensubstrat) 10 and contact surfaces (Kontaktflächen) 11a and 11b disposed on the substrate 10. The contact surfaces 11a and 11b may comprise an adhesive film (selbstklebenden Film). To form the transponder, an antenna wire 12 is mounted on the top surface of the substrate 10 (15) in a distinctive coil pattern, having two free end/connection portions 12a, 12b (Antennendrahtenden) extending over outer portions of the Kontaktflächen 11a and 11b 11a and 11b. The chip module 13 is installed between the Antennendrahtenden, with its bumps ("Anschlusselementen") 14a and 14b contacting inner portions of the Kontaktflächen 11a and 11b. Both the chip module and antenna wire are connected to the top surface of the Kontaktflächen 11a and 11b. A sort of "space transformation" is effected by this connection bridge ("Verbindungsbrücke") to connect the Antennendrahtenden a large pitch (spacing) with the Anschlusselementen of the chip module which are at a finer (smaller) pitch. Viewed from another perspective, Muehlbauer facilitates positioning the Antennendrahtenden adjacent the terminals of the chip, rather than directly over the terminal areas of the chip module as in U.S. Pat. No. 6,233,818.

Modifications to the Chip to Facilitate Interconnection

U.S. Pat. No. 5,281,855 discloses a method and apparatus for facilitating interconnection of lead wires to an integrated circuit including the provision of an additional protective layer of insulation to the top of an integrated circuit chip or die and the provision of enlarged plated electrodes to the surface of the additional insulation to form enhanced bonding pads, such pads being electrically connected through the protective layers to the normal bonding pads of the integrated circuit device. The enhanced bonding pads are made of a soft conductive metal such that external wires to be attached thereto can be bonded to the pads using a thermal compression bonding technique.

3. Conductive Coating/Metallization

The printing of conductive inks consisting of dispersed metal nanoparticles in a liquid medium onto low temperature substrates is gaining attention in the radio frequency identification (RFID) industry, especially in the manufacture of passive ultra high frequency (UHF) tags for item-level tracking of consumer goods, an electronic replacement for the ubiquitous barcode.

Application of this technology includes patterning of antenna structures on paper and synthetic films, generating bumps on flip chips and creating traces or lines for interconnection straps and jumpers.

The nanometal particles or powders in liquid synthesizing conductive ink are gold, silver and copper. Cu particles are difficult to fabricate since they oxidate (oxidize) or aggregate easily. The ink contains dispersants to prevent nanoparticle aggregation and modifiers to control viscosity and surface tension. The size of the particles range from 2 nm to 50 nm, and the lowest temperature of annealing to make the particles sufficiently conductive is determined by how easily the carrier fluid can be removed.

Printing on flexible substrates such as polycarbonate with a low temperature softening point below 150° C. is a challenge, limiting the sintering process temperature of the nanoparticles. However, polymeric films with a high glass transition temperature, such as polyimide, allow a sintering temperature of 240° C. which greatly improves the resistivity of the conductor traces.

Sintering a method for making objects from powder, by heating the material in a sintering furnace below its melting point (solid state sintering) until its particles adhere to each other. Sintering is traditionally used for manufacturing ceramic objects, and has also found uses in such fields as powder metallurgy.

To increase the thickness of the metal traces or lines for antennas targeted for low and high frequency transponders operating respectively at 125 kHz and 13.56 MHz, the printing and sintering process can be repeated several times to obtain a low enough series resistance. Alternatively, an electroless plating process can supplement the printing of the nanoparticle seed layer to realize a lower resistance.

Some of the obstacles to overcome in manufacturing conductive antennas and traces on substrates are processing inks with metal nanoparticles of specific size, depositing high resolution patterns, heating and fusing the nanoparticles into a metallic conductor without damaging the underlying substrate, preventing oxidation pre and post heat treatment, achieving acceptable conductivity and having strong mechanical adhesion of the metallic conductor with the substrate.

Metallization by Laser Sintering

The laser-based curing of printed nanoparticle ink to fabricate low resistance conductors on sensitive polymeric substrates and interconnections on semiconductor devices is a need-driven trend in the RFID industry.

Pulsed laser based curing of printed (Drop on Demand) gold nanoparticle ink combined with controlled substrate heating has been investigated and shown to produce highly conductive microstructures without damaging the polymeric substrate. Post laser treatment has been used to define small features on the pre-printed substrate by ablation. Investigations have also shown that the microstructures as well as electrical and mechanical properties are affected by the laser power and the laser scanning velocity.

Other experimental works have reported that the physical morphology of laser annealed silver based ink using a DPSS laser was determined by a number of parameters including laser fluence, the spot size of the focused laser output, working speed of the galvo minors and the repetition rate of the laser firing. It was found that a laser wavelength which is more weakly absorbed by the nanoparticles could produce a more stable and homogeneous curing condition.

Currently, photonic curing is being developed to fuse nano-scale metallic ink particles into conductive traces on low-temperature substrates by exposing them to a brief, intense pulse of light from a xenon flash lamp, as described in U.S. Pat. No. 7,820,097 ('097 patent).

For interconnection purposes, high speed drop on demand laser plating on a Cu leadframe using Ag nanoparticles to form wire-bonding pads have been investigated, confirming that the quality of the sintered Ag pad and wire bondability are almost the same as those of an electroplated Ag film.

A flip-chip bonding technique with laser assist to connect semiconductor devices to piezoelectric substrates using 50 μm diameter Ag paste bumps has been reported, using the laser to locally cure the paste bump.

Silver Nanowires

Silver nanowires are printable on flexible polymeric films and are potentially a replacement for metallic particles or flakes in producing conductive tracks with low loss signal loss at UHF.

Inkjet Printed Graphene

Graphene based ink has been used to produce thin-film transistors as well as transparent and conductive patterns on arbitrary substrates.

Some Prior Art Related to Conductive Coating

U.S. Pat. No. 7,820,097 ('097 patent), incorporated in its entirety by reference herein, discloses a nanomaterial composition and the systems in which they are used, and more particularly to nanomaterial compositions generally comprising carbon and a metal, which composition can be exposed to pulsed emissions to react, activate, combine, or sinter the nanomaterial composition. The nanomaterial compositions can alternatively be utilized at ambient temperature or under other means to cause such reaction, activation, combination, or sintering to occur. As discussed therein:

In the field of material processing, materials are often heated to cause a particular change in material morphology, a particular reaction to occur, or to cause a phase change. For example, in the area of conductive patterning, formulations or inks containing silver flakes or powder are laid down on a substrate and then heated to cause the particles to fuse and form a conductive line. In such case, the formulation is required to be fluid and often is nonconductive in order to print the pattern while at the end of the processing it must be solid and highly conductive. The heat changes the morphology of the silver to give the desired results. For silver inks, the temperature that the ink and substrate must be heated to in order to cure the ink is a function of the sintering temperature of the silver. For silver, the melting temperature is approximately 960-C. and the sintering temperature is approximately 800-C. This high temperature limits the substrates to materials that are unaffected by the high temperature. Many of the lower cost or flexible substrates such as cellulose (paper), Polyethylene Terephthalate (PET), Polyester and many other plastics cannot withstand these temperatures. Similarly, other components on the substrate, such as organic semiconductors may also decompose at elevated temperatures.

Nanomaterials have begun to be used in these applications, because of their high reactivity and lower reaction temperatures. However, they still must operate at temperatures typically above the lower cost substrate's operating temperatures.

Therefore, in the field there exists a need to process materials at lower temperatures to allow more economical substrates to be used. More specifically, there is a need in the conductive patterning market to produce high conductivity patterns on low temperature substrates.

The '097 patent relates generally to uses of novel nanomaterials composites comprised of relatively unaggregated metals particles. The processes described in the PCT 05/027711 Application produce the new materials in which some of the composites are composed of carbon and a metal while others are composed of an oxide and a metal. These materials, while being unique and novel unto themselves, can be used in unique and novel applications. Additionally, some of the uses have been shown to work with other nanomaterials. The new uses are accomplished by exploiting the unique material properties that exist in nanomaterials. Specifically, it has been observed that nanomaterials have a unique combination of attributes and properties that allow them to be used for electrical and catalytic applications.

The '097 patent discloses exploiting these properties and reveals novel uses in the area of conductive patterning. For example, the '097 patent can relate to creating conductive patterns using nanometals at room or relatively low temperatures, using a photonic curing process in conjunction with nanometals to create highly conductive patterns and using nanometals in conjunction with xerographic printing techniques.

One embodiment of the '097 patent uses the carbon/metal composite to create conductive patterns at room temperature. This is accomplished by either a simple dispersion of the material in water and then printing the dispersion on a paper substrate. Forming conductive patterns on other substrates at room temperature has also been accomplished using other dispersion techniques.

Another embodiment of the '097 patent relates generally to a novel method for reacting, activating or sintering nanomaterials and combinations thereof. For example, the '097 patent can relate to the processing of nanometal powders, such as nanometals. Metals, such as, but not limited to, silver, copper, gold, platinum, palladium, tin, antimony, indium and lead are examples of materials that may be used. In the '097 patent, nano refers to at least one aspect of the material having dimensions less than about 1 micron. Generally, this dimension is less than about 500 nm, and even more so less than about 100 nm.

It has been observed that some nanoparticles, including most metal nanoparticles, are generally very absorbent of photonic radiation, i.e., the particles behave as good blackbodies and have high absorptivity of electro-magnetic radiation. Additionally, nanoparticles tend to have lower reflectivity and poorer thermal conductivity as compared to the bulk materials. Nanoparticles also have a much larger surface area to mass ratio and have a low thermal mass individually than micron or larger sized particles. These qualities suggest irradiation of the nanoparticles with a pulsed photonic source, more specifically a broadcast photonic source, could momentarily heat the particles to a very high temperature. (A "photonic source" is a radiation source in the electromagnetic spectrum including, but not limited, to gamma rays, x-rays, ultraviolet, visible, infrared, microwaves, radio waves, or combinations thereof.) This effect is very advantageous, as noted in several examples listed below.

The '097 patent addresses the limitations described in the prior art by providing a novel method and system for processing nanomaterial. The '097 patent uses a high powered, pulsed photonic source to process the nanoparticles while minimally affecting the substrate. By such process, this overcomes limitations of the prior art. In the '097 patent, a film or pattern containing nanomaterial is fabricated on a surface. Such film or pattern may be fabricated using techniques such as inkjet, screen-printing, gravure printing, xerography, stamping, flexography, offset printing, painting, airbrushing, etc. Once the film or pattern has dried on the substrate, the pattern is subjected to a high-powered, pulsed photonic emission source. The high absorptivity of the nanomaterials and low thermal mass of particles causes them to be rapidly heated while the poor thermal conductivity and short pulse length retards the nanoparticles ability to transfer heat to their surroundings. The result is that the particle temperature is increased quickly to temperatures that cause them to fuse. The poor conductivity, low absorptivity and high thermal mass of the substrate insures that much of the energy from the photonic pulse goes into heating up the particles and minimal energy is transferred to the substrate or surrounding components.

By using a method and system that focuses the energy delivery on the film or pattern, the '097 patent purports to overcome the limitations of the prior art.

In yet another embodiment, the nanometal is used in conjunction with a photonic source for catalytic applications. Specifically, this can be accomplished at much lower temperatures than current technologies.

One use that is particularly enabled by the carbon/metal nanocomposite material is electroless deposition/plating/printing. In an embodiment of the '097 patent, a conductive ink has been made with the silver/carbon nanocomposite material that will cure and possess metallic conduction without requiring a thermal cure (i.e. ambient room temperature). Such ink can be used for producing metal patterns.

In one embodiment, the silver/carbon composite is combined with de-ionized water and then mixed using zirconia beads in a gyroscopic mixer. The dispersion or ink is then printed on a paper substrate. As the dispersion dries, the material will turn from black to silver in color. Additionally, the resistivity will go from infinite down to approximately 5 times bulk silver. Once dried, the pattern has good adhesion and long-term conductivity.

It is hypothesized that the unique combination of carbon, silver and paper enable the highly conductive pattern to be produced. It is believed that the wicking of the water into the paper creates high hydrostatic pressure gradients that force the particles into intimate contact. Additionally, the carbon which keeps the silver particles apart appears to be more dispersible in the water and tends to wick out with the water leaving the bare silver particles in contact with the paper fibers. When in contact with one another, the bare silver nanoparticles will reduce their surface energy by fusing and thus form a highly conductive pattern that is bonded to the paper fibers. The following example illustrates an embodiment of the '097 patent.

Another embodiment of the '097 patent includes a method and system for processing nanomaterials to create conductive patterns. The method and system of processing the nanomaterials takes advantage of the unique properties of nanoparticles, as compared to micron or the bulk material. For example, nanoparticles tend to have low reflectivity, high absorptivity, reduced sintering temperatures, higher reactivity and poor thermal conductivity, as compared to the bulk material property. The '097 patent uses a high-powered, pulsed, broadcast photonic source to process the nanomaterials while minimally affecting the substrate, thus overcoming the limitations of the prior art.

In the '097 patent, a film or pattern containing nanomaterial was fabricated on a surface. Such film or pattern may be fabricated using techniques such as inkjet, screen-printing, gravure printing, xerography, stamping, flexography, offset printing, painting, airbrushing, etc. Once the film or pattern had dried on the substrate, the pattern was subjected to a high-powered, pulsed photonic emission source. The high absorptivity of the nanomaterials and low thermal mass of particles causes them to be rapidly heated while the poor conductivity and short pulse length retards the nanoparticles ability to transfer heat to their surroundings. The result was that the particles' temperature is increased quickly to temperatures enabling them to fuse. The poor conductivity, low absorptivity and high thermal mass of the substrate insured that much of the energy from the photonic pulse went into heating up the particles and minimal energy was transferred to the substrate or surrounding components. In summary, the energy delivered to the particles happened so quickly that the particles fused before they have time to transfer their heat to the substrate. This natural discrimination capability of the nanoparticles allows a pulsed, broadcast emission to cure a large complex printed pattern in a single flash without damaging the substrate. Typically, this technique deposits of order 1 J/cm^2 on the substrate. This is generally below the damage level for the substrate at the pulse lengths used. For systems which use a continuous laser to sinter metal nanoparticle films of order 100 J/cm^2 is needed. Since this involves depositing a much higher areal energy density, the laser generally needs to be focused only on the printed pattern of the substrate adjacent to the pattern or the substrate will be damaged. Furthermore, the laser curing is a serial process and requires expensive equipment and critically aligned optics. It is possible to use a pulsed laser to accomplish the above as the required areal energy density would be low, and such a technique may even be preferable when curing a small area in a repetitive fashion. A pulsed laser system is less desirable as the area to be cured becomes larger. In this case the pulsed emission from a gas discharge, such as a xenon flash lamp, becomes more desirable. A reason for this is largely economic, as the hardware for gas discharge lamp system is cheap and has a high electrical to light conversion efficiency. This is demonstrated by the fact that a flash lamp is often used to optically pump a laser system. Furthermore, a gas discharge lamp system does not require complex optics and critical alignment as a laser-based system does. Still, pulsed solid-state and other pulsed emission sources are continually becoming more and more economical. Multiple emission sources could be used in parallel to achieve a broadcast effect. Since this curing technology does not place a significant thermal load on the substrate or surrounding components, multi-layer circuits, even with embedded devices, are more practical on thermally fragile substrates such as paper or plastic.

A method of an embodiment of the '097 patent is to expose the nanoparticles to a pulsed emission source, so as to cause their morphology or phase to change and/or cause the material to react without substantially affecting the substrate that they are contained within or reside on. Several tests were performed to evaluate the effectiveness of curing nanoparticle formulations for conductive inks. In the tests, formulations were prepared by mixing different nanomaterials with various solvents, surfactants and dispersants and producing films or patterns with the formulations. The films and patterns were applied to substrates, subjected to the pulsed emission source and the conductivity, adhesion, surface morphology and curing depth were measured. The conductivity was determined using a four-point probe and thickness gauge. In some cases, the films or patterns were allowed to dry prior to being subjected to the pulsed emission source.

When the film or pattern was subjected to the pulsed emission source, the particles heated-up and sintered. When this happens, it was found that the absorptivity of that portion of the pattern decreased and its reflectivity and thermal conductivity increased. Hence the process was self-limiting. This may imply, in some cases, that it was better to apply a single intense pulse rather than multiple lower intensity pulses. In developing the '097 patent, the effects of pulse duration and pulse energy were investigated. The total power delivered to the pattern was a function of the pulse energy, pulse duration and optical footprint area. Tests were performed with pulse lengths from 0.7 microseconds-100 milliseconds using xenon flash lamps.

In development, a mixture of approximately 30% mass of Nanotechnologies, Inc. 30 nm silver, 60% mass isoproponal and 10% mass hydrochloric acid was used as the formulation to produce a conductive film on PET. As the pattern dries its conductivity increases to about $\frac{1}{20}$.sup.th of bulk silver. The films were applied to a 3.5 mil matte PET substrate with a "2.5" wire wound draw down bar and allowed to dry. In some cases, multiple passes were made. Typically, three passes yielded a 2-3 micron thick dried film. After subjecting the film to the pulse, in all cases the conductivity increased. Increases in conductivity to approximately $\frac{1}{10}$ and in some cases $\frac{1}{3}$ to $\frac{1}{2}$ the conductivity of silver was observed. In testing, it was generally found that for a given total energy, the patterns processed using a higher power and a shorter pulse length gave better conductivity. Testing also showed that there was a threshold areal energy density, which if exceeded, blows the film off of the PET surface. Tests performed at a given energy above the threshold showed that the samples processed with a long pulse length had substantial thermal damage to the substrate, whereas the samples subjected to the shorter pulse lengths showed minimal or even undetectable thermal damage to the substrate. In this series of tests, the samples subjected to the shorter pulse lengths showed visibly cured silver around the edges of the blown off pattern, whereas the longer pulse length samples did not.

This evidence suggested that the shorter pulse lengths worked better. This information has far reaching implications. For short pulse lengths, it is possible to fully cure a sample without causing significant damage to the substrate. This can remove the thermal limitations of the substrate and allows a wide range of new substrates to be used such as PET, polyester, plastics, polymers, resins, fabrics, non-woven fabrics, paper products and organic compounds. While this process works for low temperature substrates, it is also applicable to high temperature substrates such as ceramics, composites, laminates, glass, silicon and most materials currently being used in the conductive patterning market. One aspect of the substrate that should be reviewed is its absorptivity in the wavelength of the flash emission. Generally, the substrate should not have a high absorptivity in the wavelength range of the flash because if it absorbs the energy of the flash it maybe damaged. If needed, filters can be used to remove the undesirable emission bands. One method to test whether the substrate is affected by the emission is to subject it to the cure conditions without any pattern. The substrate can then be inspected to determine if it has been adversely affected.

4. Interconnections

There are several conventional methods of interconnecting a die with an interposer or an interposer with a conductive or metallized substrate. The techniques for connecting a die to a substrate include wire bonding, flip chip bonding, thermo compression bonding, adhesive bonding, welding or soldering, using ultrasonic energy, conductive adhesive, temperature and pressure, laser light or heat to create the electrical bond. The techniques for interconnecting an interposer with a conductive coated substrate include crimping, laser welding, soldering and applying an isotropic conductive film to produce the interconnect.

SUMMARY

It is a general object of the invention to provide improved techniques for coupling with, powering and reading smart cards, such as RFID tags.

According to an embodiment of the invention, generally, an inductive coupling antenna may be combined with a capacitive coupling antenna energizing a single RFID integrated circuit when in an electrostatic field or electromagnetic field generated by a touch screen device or an RFID reader. The operating frequency of the RFID IC is dependent on the power source energizing it, the resonance frequency of the antennas and its own internal capacitance. The antennas can be connected in series or parallel to the integrated circuit and the connections thereto can be a two or three point connection. By using un-insulated end portions of an inductive wire antenna, the connections to the interposer or antenna substrate can be a low resistance connection, enhancing the electrical performance.

According to an embodiment of the invention, generally, techniques may be provided for capacitively coupling an RFID tag with a touch screen device, improving flip-chip type connecting of an integrated circuit on an interposer for later connection to a conductive coated antenna on a substrate—in other words, the "face up" terminals of the IC for connecting with the interposer are oriented down towards the interposer for further connecting with an antenna substrate (typically, a capacitive type antenna). The means for accomplishing this may include forming enlarged contact areas on the interposer or antenna substrate and/or enlarged terminal areas on the integrated circuit. In addition, techniques are provided to improve the contact resistance, i.e. lowering the interconnection resistance, between the integrated circuit and the interposer as well as the interposer and the antenna substrate. Some techniques for accomplishing this may be described in the above-referenced U.S. 61/511,990 filed Jul. 27, 2011.

Some of the following techniques may be incorporated into various embodiments of the invention, alone or in combination with one another forming channels in an antenna substrate or interposer, and selectively coating relevant portions of the channels with conductive nanoparticles forming enlarged connection areas on the antenna substrate or interposer comprising at least one layer of nanoparticles, for receiving the terminal areas of an integrated circuit.

using nanoparticles (and sintering) forming enlarged terminal areas on the integrated circuit removing insulation from selected portions of an insulated (or self-bonding) wire, and preventing oxidation by coating with a conductive layer of nanoparticles forming conductive plates or wings on a substrate for connection to an interposer or a die with enlarged terminal areas forming an inductive track on a substrate in combination with capacitor plates to allow for inductive or capacitive coupling with a reader device connecting an inductive coil in parallel with a dipole capacitive coupling antenna and operating at different frequencies, each operating at its preferred frequency connecting an inductive coil in series with a monopole capacitive coupling antenna achieving low resistance interconnections between the integrated circuit and the interposer or the antenna substrate and low resistance interconnections between the interposer and the antenna substrate using the electrostatic field of a touch screen device to power up a capacitive coupling tag Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGs). The figures may be in the form of diagrams. Some elements in the figures may be exaggerated or drawn not-to-scale; others may be omitted, for illustrative clarity. Any text (legends, notes, reference numerals and the like) appearing on the drawings are incorporated by reference herein. When terms such as "left" and "right", "top" and "bottom", "upper" and "lower", "inner" and "outer", or similar terms are used in the description, they may be used to guide the reader to orientations of elements in the figures, but should be understood not to limit the apparatus being described to any particular configuration or orientation, unless otherwise specified or evident from context.

DETAILED DESCRIPTION

Figure 1A:
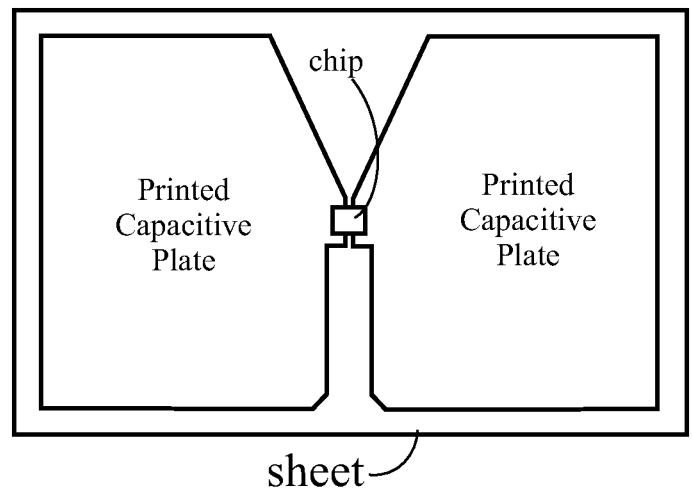
FIG. 1A is a diagram showing an integrated circuit (chip) connected to capacitive plates, according to the prior art outlined in U.S. Pat. No. 6,611,199 and U.S. Pat. No. 6,018,299.
Figure 1B:
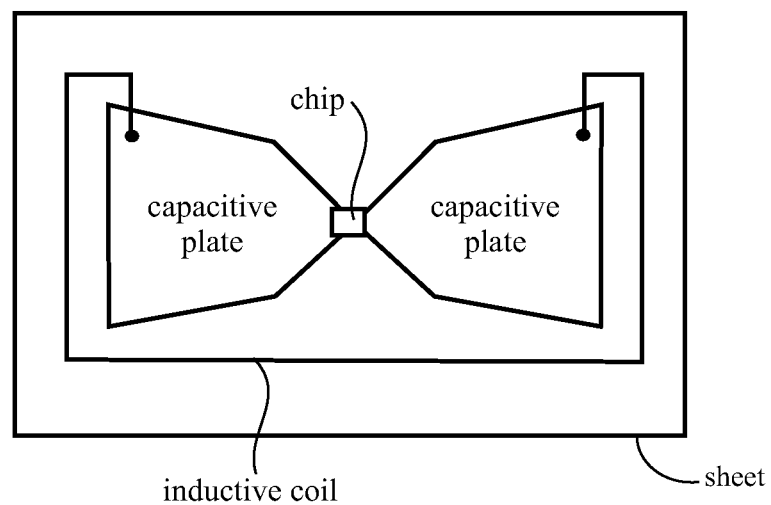
FIG. 1B is a diagram showing an illustrative design of an inductive antenna (having one or more turns) connected in parallel with a dipole capacitive (plates) antenna, and connected (as indicated) with an RFID chip.

Various embodiments may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another.

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, well-known features may be omitted or simplified in order not to obscure the descriptions of the invention(s).

Reference herein to "one embodiment", "an embodiment", or similar formulations, may mean that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In the following descriptions, some specific details may be set forth in order to provide an understanding of the invention(s) disclosed herein. It should be apparent to those skilled in the art that these invention(s) may be practiced without these specific details. In other instances, descriptions of well-known steps or components, may be described only generally, or even omitted, in order to not obscure the invention(s) being described. Headings (typically underlined) may be provided as an aid to the reader, and should not be construed as limiting.

Some Terminology

The following terms may be used in the descriptions set forth herein, and should be given their ordinary meanings unless otherwise explicitly stated or as may be evident from context.

The invention(s) relate(s) generally to coupling a tag, comparable to an RFID tag, via capacitive rather than electromagnetic coupling to an external device which may be any device having a capacitive touchscreen. Generally, when a tag, such as in the format of a smart card is presented to (laid upon) the touchscreen, some information stored on the card may be detected by the touchscreen device. Application(s) within the device may react to the tag information, such as to enable transactions, and the like (generally any action that an RFID tag may invoke). Data may be transferred via the capacitive coupling between the tag and the device, in one or both directions. The device may present additional information to the user of the tag in the form of multimedia content (images displayed on the touchscreen, sounds, etc.). Electrical power can also be conveyed from the touchscreen device to the tag to power circuitry within the tag.

Such a capacitive coupling tag may communicate at near field distance with a touch screen device when held by a person acting as a ground electrode causing potential difference.

The capacitive coupling tag may be flexible, and consist of a conductive electronic structure printed or sprayed onto a paper or synthetic substrate. The electronic structures can also be chemically or laser etched from a coated or metallized conductive layer. The printing techniques may include offset printing, gravure printing, flexographic printing, dye sublimation printing, inkjet printing and laser jet printing. The spraying techniques may include airbrush spraying and masked patterned spraying of conductive ink, metallic nanoparticle or nanowire dispersions (such as graphene, carbon nanotubes or silver nanowires) onto a substrate.

The curing or sintering of the printed or sprayed metal precursor inks on the flexible substrate can be by focused laser beam, plasmonic, photonic flash or microwave exposure or a combination thereof.

The conductive structures may serve as memory elements, an array of fusible links or an array of scratchable pads which are connected via conductive traces to a touch electrode on the surface of the tag, enabling identification of the tag when in the electrostatic field of a touch screen display. Therefore, the circuit structures can be detected by capacitive near-field coupling when presented to a touch screen display, such as by a person, animal or object being grounded.

The grounded person, animal or object may operate as a voltage source by the sheer fact of being grounded when a conductive position on the surface of the tag is touched while at the same time being in the presence of the electrostatic field generated by the touch screen display. By touching the conductive surface of the tag (at a single electrode position or multiple electrode positions) an electrical charge may be released and transported to the display via the internal conductive traces. A measurement algorithm in the software application of the device recognizes the charge as a keyboard input and thus represents a data input.

The touch screen device may host an application which interrogates the tag when in the electrostatic field generated by the device. The tag, when placed on the screen, can be illuminated by the device (such as the backlight of the device), in scanning mode, allowing for the conduction of electrons from an illuminated section of the tag to be transferred to a non-illuminated section. To achieve this, the tag may incorporate a polymer photovoltaic cell(s) which can be activated by the illumination emission of the screen. The photovoltaic cell can be connected to an array or matrix of fusible links which when removed mechanically or by laser ablation provides the tag with an unique read only code. Functional layers of the polymer/fullerene based photovoltaic cells can be coated on the paper or synthetic substrate by means of gravure and flexographic printing.

Data may be exchanged and energy may be harvested by the tag from the touchscreen device in this manner (using light). The light, for example, may be modulated to convey information.

A technique of producing a photoconductive cell in a flexible tag to transport electrical charges via the conductive traces in the tag from an illumination area on a display to another area to stimulate a keyboard entry, includes taking a transparent ITO substrate or gold coated substrate as the first electrode and putting down an absorption layer of Molybdenum disulfide ($MoS_2$) followed by a low work function electrode layer such as aluminum to produce a very simple photosensitive cell.

In the case of the photoconductive cell tag it is not necessary to provide a potential difference by holding the tag while the tag is being interrogated by the touch screen device.

The memory cells, photovoltaic cells, links and conductive traces can be formed on an adhesive layer for further transfer to a paper or synthetic substrate. The top layer of the paper or synthetic substrate may be partly transparent to allow stimulation of the cells by the light intensity of the touch screen device.

The tag may have several touch positions, acting as electrodes, representing a sequence of numbers or positions spaced at equal or irregular distances. The touch positions on the tag may be set-out on a linear or non-linear axis (or grid, or array). The touch positions may be a rectangular box, circle or point on the surface of the tag. The tag may be grounded by a single touch at a defined position on the tag or may require the simultaneous touching of two positions to initiated communication with the device.

The sequence of touching the tag at defined positions representing alphanumeric data may be used as a security code for accessing internet based applications.

The field of application includes online gaming such electronic scratch cards, lottery tickets or in the secure credential space as an identifier to proceed with an internet payment or to access data.

Various conventional techniques for printing memory elements and photovoltaic cells on substrates will be discussed. The memory elements can be printed using water based dispersion of poly (3,4-enthylenedioxythiophene) doped with poly(styrensulfonate) (PEDOT:PSS). The layer structure of a photovoltaic cell can be paper/Zn/ZnO/photoactive layer/PEDOT:PSS, where Zn and PEDOT:PSS are used as cathode and anode respectively.

A tag may interact in various ways with an external device such as a touchscreen device including, but not limited to, by electromagnetic coupling (conventional RFID techniques), capacitive coupling (as described above) and light (as described above). Additionally, interaction between the tag and the external device may be via sound (most touchscreen devices have sound transducers, the tag could incorporate a sound transducer). Many touchscreen devices also have a camera and can recognize patterns on the tag representing data. The tag can be provided with biometric information and the ability to recognize a given user. A tag which is a smart card can also have a conventional magnetic stripe. The tag may have a hologram, which may be recognized by the touchscreen reader. Other variations are envisioned, and may be included in the scope of the invention.

Touchcode

The touch structure defined in EP 2 418 607 A1 describes an arrangement of figures encoding the stored data on the card. The application describes in detail different encodings and explains that the possible number of arrangement is dependent on the resolution of the touch screen. The number of possible possibilities is given as 448.072.338 and can be extended by using smaller touch code structures.

The touch panel consists of capacitors spread over the whole touch sensitive area connected to a voltage source that is located in the mobile device. The user, usually connected to ground, generates an electrostatic field, which interferes with the original electrostatic field of the touch panel. Since the electrostatic field of the touch panel and the user are different a charge displacement takes place which results in a movement of electrons in the touch panel (and the user). A method in the touch panel evaluates the "concentration" of electrons which can lead to generating events like the key inputs.

Some Embodiments

Regarding encoding of data on a tag, in a first embodiment, a capacitive coupling tag may have at least one surface electrode on the tag which is connected to an internal array of fusible links which when presented to a touch screen or touch panel device by a user, the data represented by blown or un-blown links can be read by the device through capacitive coupling.

As the user is usually connected to ground, this generates an electrostatic field which interferes with the original electrostatic field of the touch screen or touch panel device. Since the electrostatic field of the touch panel and the user are different, a charge displacement takes place which results in a movement of electrons in the touch panel (and the user). A measurement algorithm in the touch panel evaluates the "concentration" of electrons which leads to generating an event like a keyboard entry.

The conductive traces and structure lead the electrostatic field to the relevant sections of the touch panel and simulates a keyboard input.

Figure 2A:
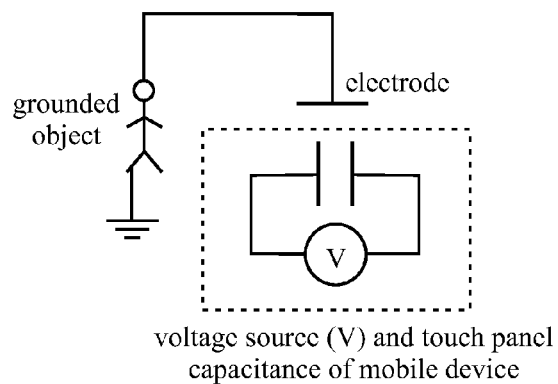
FIGS. 2A-2D are diagrams illustrating various aspects of capacitive coupling.
Figure 2B:
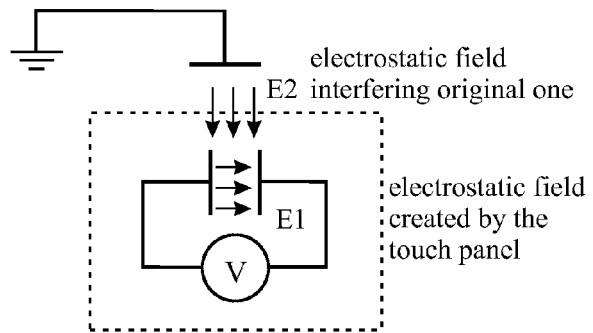

FIGS. 2A and 2B illustrate the grounded object (such as user) and the electrode formed by the structure of the tag. The section in dashed lines indicates elements disposed in (or on)

the touchscreen (or "mobile") device and shows mainly the loaded capacitor of the touch panel without evaluation logic.

Grounding may also place when it is done by using a high-resistive element like a human body or animal which has approximately 10 k-Ohm.

FIG. 2B shows the interference of the two generated fields. The grounded electrode generates an electrostatic field (E2) which interferes with the original field (E1).

The object may either be grounded, or may at least generate an electrostatic field itself.

The diagrams illustrate the grounded object and the electrode formed by the structure of the card. The highlighted section is located inside the mobile device and shows mainly the loaded capacitor of the touch panel without evaluation logic (not shown).

In another embodiment, the capacitive coupling tag has scratchable pads which replace the array of fusible links. In this particular arrangement, the user can select numbered pad positions on the surface of the tag which when mechanically scratched by the user represent a series of numbers. The tag can be presented to a touch screen device to check the scratched numbers against the winning lottery numbers residing at an internet database.

In another embodiment, the tag has touch positions on the surface of the tag which represent numbers. When the tag is placed on a touch screen device, the sequence of number touching selection is checked against an internet database for security purposes. The tag may have transparent or non-transparent positions, and the user may be able to select numbers which appear on the screen through the transparent positions in the tag.

In another embodiment, photosensitive cells in the tag are used to absorb and convert light energy from the touch screen device and redirect this energy to positions in the tag to stimulate a keyboard entry on the touch screen.

Photosensitive Element (Independent Voltage Source)

Figure 2C:
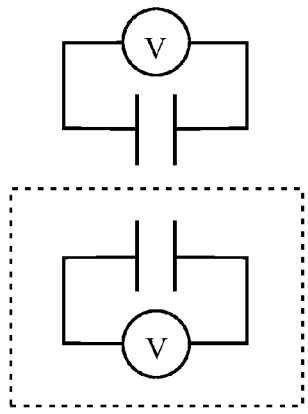
Figure 2D:
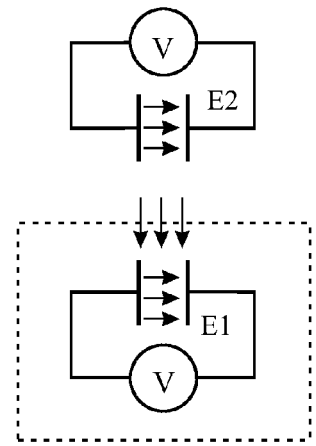

Instead of a grounded voltage source, an independent voltage source can be used. This source can be in the form of a battery, forming two electrodes to influence the original electrostatic field of the touch screen device. See FIGS. 2C and 2D.

The independent voltage source creates an electrostatic field (E2) at the electrodes (potential free, floating).

A portion of the electrostatic field (E2) interferes with the original field (E1).

Figure 2E:
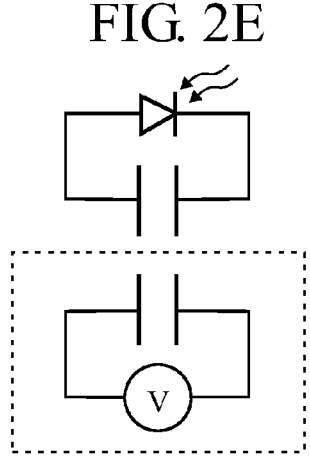
FIG. 2E is a diagram showing incorporating a photosensitive element.

The voltage source can be replaced by a photosensitive element (e.g. solar cell) that creates the necessary voltage. See FIG. 2E In a simple application, the generated voltage may be guided by traces to the electrodes and simulate keyboard inputs. In a more sophisticated application (not shown) the photosensitive element can drive a capacitive coupling RFID chip with power which allows for much more complicated data exchange.

Additional Description

A structure consisting of more than one conductive element gives a possibility to make decisions or to enable a sequence based application, where the user gets a visual information from the display and decides which element must be touched.

The tag may have a non-opaque ("see through") section where the user can "watch through" so that at least a portion of the screen covered by the tag may be observed by the user. The touchscreen (mobile) device may provide information (e.g. numbers) about the expected information the user has to enter. This may generate a sequence which can be random or can be synchronized with some information from the Internet.

The tag can provide more security by moving the intelligence from itself to the mobile device, for example involving the Internet where a security algorithm (PKI, etc.) is stored.

Figure 3A:
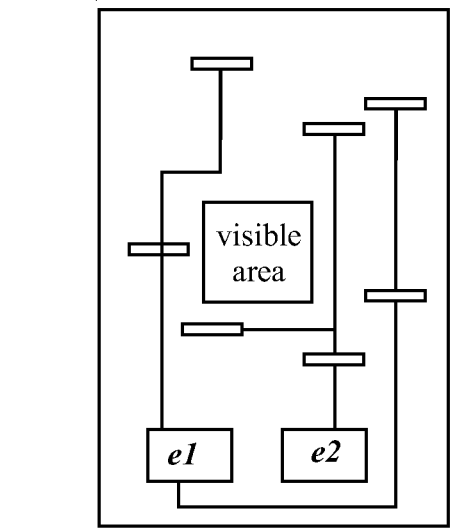
FIGS. 3A-3C are diagrams illustrating cards having visible areas.

FIG. 3A shows a tag with two conductive sections and a transparent window (visible area). The user has to touch the two (big) electrodes (e1, e2).

Figure 3B:
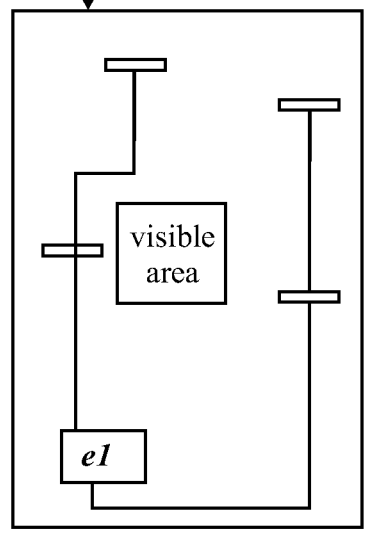
Figure 3C:
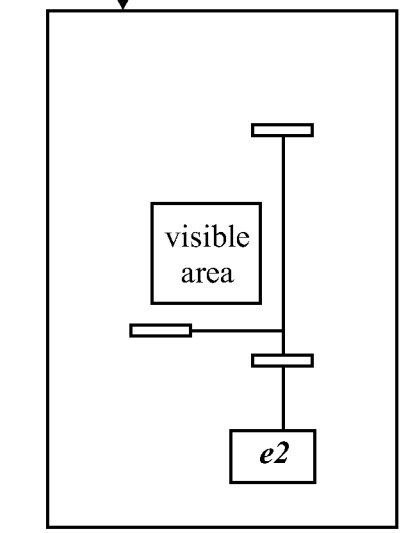

FIGS. 3B and 3C illustrate the same solution, but based on two separate layers (e.g. two substrate or other electrical insulation) in the tag.

Scratch Cards

A scratch card can be realized by shielding the grounded conductive electrodes. The shielding layer can be removed by scratching, connecting the electrode with the area of the touch panel.

A insulating layer can consist of a conductive element that shields one or more electrode of the card so that it does not have any influence on the touch panel of the mobile device. Removing this layer can create a coding different from the original one. This can issue events like "won" or "not won", and can also ensure validity of the user's card.

Light-Driven Card

Figure 4:
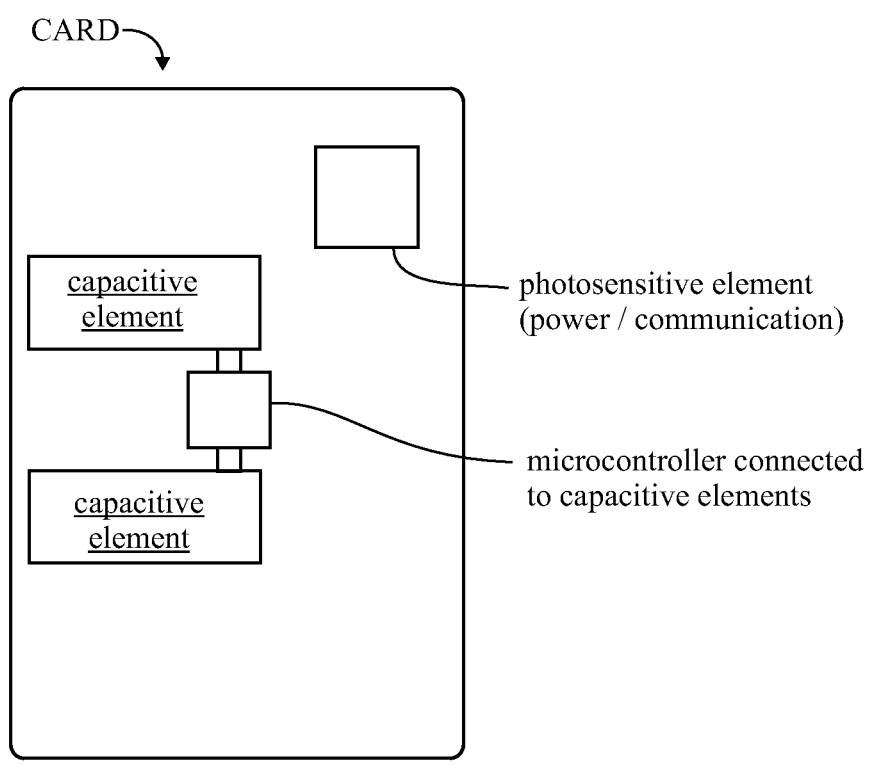
FIG. 4 is a diagram showing a card incorporating a photosensitive element.

FIG. 4 illustrates that a card can be driven by the light emitted from the display of the mobile phone. The transponder is placed onto the display in a way that the photosensitive element overlaps a specific area on the mobile device which is controlled by the application.

The application activates this area and switches the light on. This generates enough power to supply the microcontroller which is connected to conductive areas (wings, red) which are communicating with the touch panel of the mobile device by using capacitive coupling. The created data link is unidirectional from the transponder to the touch panel.

A communication channel in the opposite direction can be realized by modulating the light emitted from the display. This can be realized by using a single photocell for both, power supply and communication. It is also possible to use more photocells where one supplies the chip and the other ones are used for communication. The application generates the appropriate modulation (e.g. fast blinking of a display area) The microcontroller has to evaluate this modulation Additional Description The invention relates to a capacitive coupling tag, which communicates at near field distance with a host computing device by using the touch screen display of the host when the tag is placed on the touch screen or held in contact in close proximity to the touch screen by a person acting as a ground electrode and thereby causing a difference in electrical potential.

The tag may be flexible, consisting of a conductive electronic structure printed or sprayed on to a paper or synthetic substrate. The electronic structures could also be formed by chemically or laser etching a coated or metallized conductive layer applied to the substrate material. The printing techniques for applying the conductive electronic structures include offset printing, gravure printing, flexographic printing, dye sublimation printing, inkjet printing and laser printing. The spraying techniques include airbrush spraying and masked patterned spraying of copper particle conductive ink, metallic nanoparticle or nanowire dispersions (such as graphene, carbon nanotubes or silver nanowires) onto a substrate.

The curing or sintering of the printed or sprayed metal precursor inks on to the flexible substrate can be accomplished using focused laser beam, plasmonic, photonic flash or microwave exposure or a combination thereof.

The conductive structures may serve as memory elements, fusible links or user-defined scratchable arrays which connect via conductive traces to a conductive electrode on the surface of the tag, enabling the software application on the host device to read the memory elements on the tag when the tag is placed in the electrostatic field of the hosts touch screen display. The conductive electronic structures can be detected by capacitive near-field coupling when the tag is presented to a touch screen display by a person, animal or object that is grounded. The grounded person, animal or object operates as a voltage source by the sheer fact of being grounded when a conductive position on the surface of the tag is touched while at the same time being in the presence of the electrostatic field generated by the touch screen display. By touching the tag the grounded user releases an electrical charge and, as the tag and touch screen display are capacitively coupled together, the charge is transferred from the tag to the display of the host device and subsequently to the software application residing on the host device. A measurement algorithm in the software application recognizes the charge as keyboard input and thus represents a data input.

In another embodiment, the tag would incorporate polymer photovoltaic cell(s) which would be activated by the illumination emission of the touch screen display. In this embodiment data transmission between the tag and the touch screen display of the host device does not require contact or connection with or to a grounded person, animal or object. The required voltage source to power the tag is provided by the light emitted by the touch screen display. All functional layers of the polymer/fullerene based photovoltaic cells can be coated on the paper or synthetic substrate by means of gravure and flexographic printing.

A software application residing on the host device enables the touch screen display to interrogate a tag placed in the electrostatic field generated by the touch screen display. The tag, when placed on the screen, can be illuminated in scanning mode allowing for the conduction of electrons from the illuminated tag to be transferred to the application program to be acted upon.

A technique of producing a photoconductive cell in a flexible tag to transport electrical charges via the conductive traces in the tag from an illumination area on a display to another area to stimulate a keyboard entry, includes taking a transparent ITO substrate or gold coated substrate as the first electrode and putting down an absorption layer of Molybdenum disulfide (MoS2) followed by another low work function electrode layer such as aluminum to produce a very simple photosensitive cell.

The memory cells, photovoltaic cells, links and conductive traces can be formed on an adhesive layer for further transfer to a paper or synthetic substrate. The top layer of the paper or synthetic substrate may be partly transparent to allow stimulation of the cells by the light intensity of the touch screen device.

The tag may have several touch positions, acting as electrodes, representing a sequence of numbers or positions spaced at equal or irregular distances. The touch positions on the tag may be set-out on a linear or non-linear axis. The touch positions may be a rectangular box, circle or point on the surface of the tag. The tag may be grounded by a single touch at a defined position on the tag or may require the simultaneous touching of two positions to initiated communication with the device.

The sequence of touching the tag at defined positions representing alphanumeric data may be used as a two factor security code for accessing internet based applications or networks. You must have the tag and know the touch code to gain access.

The field of application includes online gaming such electronic scratch cards, lottery tickets or in the secure credential space as an identifier to proceed with an internet payment or to access data. An example of one application might be a consumer using an illuminated tag to authenticate event tickets purchased from third party sources by simply placing the ticket on the touch screen display. The application would illuminate the tag and the unique response from the tag would authenticate the ticket (or not) and in a more comprehensive application embodiment if authenticated authorize the release of payment to the seller of the funds held in escrow until the buyer could confirm ticket delivery and authenticity.

In another embodiment a contactless smart card that has been printed with the photovoltaic cell material would energize the embedded RFID IC using the voltage generated when the smart card is illuminated by the lighted touch screen display. As long as the smart card remains in the electrostatic field generated by the touch screen device the RFID IC would be able to send data to and receive data from the host computing device.

While the invention(s) has been described with respect to a limited number of embodiments, these should not be construed as limitations on the scope of the invention(s), but rather as examples of some of the embodiments. Those skilled in the art may envision other possible variations, modifications, and implementations that are should also be considered to be within the scope of the invention(s), based on the disclosure(s) set forth herein, and as may be claimed.

What is claimed is:

1. An RFID tag comprising:
an inductive coupling antenna combined with a capacitive coupling antenna and energizing a single RFID integrated circuit when in an electrostatic field or an electromagnetic field generated by a touch screen device or an RFID reader.

2. The RFID tag of claim 1, wherein the inductive and capacitive antennas are connected in series to the integrated circuit.

3. The RFID tag of claim 1, wherein:
the inductive and capacitive antennas are connected in parallel to the integrated circuit.

4. The RFID tag of claim 1, further comprising:
photovoltaic elements on the tag.

5. The RFID tag of claim 1, further comprising:
touch electrodes on the tag.

6. The RFID tag of claim 5, further comprising:
shielding on some of the electrodes which may be scratched off.

7. The RFID tag of claim 1, further comprising:
a see-through area on the tag.

8. An RFID tag comprising:
an inductive coupling antenna combined with a capacitive coupling antenna and energizing a single RFID integrated circuit when in an electrostatic field or an electromagnetic field generated by a touch screen device or an RFID reader;
wherein end portions of an inductive wire antenna are un-insulated, and connections to an interposer or antenna substrate comprises a low resistance connection, enhancing the electrical performance.

9. The RFID tag of claim 8, wherein the inductive and capacitive antennas are connected in series to the integrated circuit.

10. The RFID tag of claim 8, wherein the inductive and capacitive antennas are connected in parallel to the integrated circuit.

11. The RFID tag of claim 8, further comprising:
photovoltaic elements on the tag.

12. The RFID tag of claim 8, further comprising:
touch electrodes on the tag.

13. The RFID tag of claim 12, further comprising:
shielding on some of the electrodes which may be scratched off.

14. The RFID tag of claim 8, further comprising:
a see-through area on the tag.

15. An RFID tag comprising:
an inductive coupling antenna combined with a capacitive coupling antenna and energizing a single RFID integrated circuit when in an electrostatic field or an electromagnetic field generated by a touch screen device or an RFID reader;
further comprising:
touch electrodes on the tag; and
shielding on some of the electrodes which may be scratched off.

16. The RFID tag of claim 15, wherein the inductive and capacitive antennas are connected in series to the integrated circuit.

17. The RFID tag of claim 15, wherein:
the inductive and capacitive antennas are connected in parallel to the integrated circuit.

18. The RFID tag of claim 15, further comprising:
photovoltaic elements on the tag.

19. The RFID tag of claim 15, further comprising:
a see-through area on the tag.

* * * * *